United States Patent [19]

Uchiike et al.

[11] Patent Number: 5,124,937

[45] Date of Patent: Jun. 23, 1992

[54] DATA STORING APPARATUS

[75] Inventors: Mitsumasa Uchiike, Kyoto; Toyoaki Fukushima, Uji, both of Japan

[73] Assignee: Shimadzu Corporation, Kyoto, Japan

[21] Appl. No.: 499,739

[22] Filed: Mar. 27, 1990

[30] Foreign Application Priority Data

Sep. 24, 1987 [JP] Japan .................. 62-239394

[51] Int. Cl.$^5$ .............................................. G11B 9/00
[52] U.S. Cl. .................................... 364/557; 364/550
[58] Field of Search ........................ 364/557, 550, 579; 374/126, 127, 128, 129, 9

[56] References Cited

U.S. PATENT DOCUMENTS

| 4,504,920 | 3/1985 | Mickowski et al. | 364/550 |
| 4,636,093 | 1/1987 | Nagasaka et al. | 374/186 |
| 4,967,381 | 10/1990 | Lane et al. | 364/537.01 |

OTHER PUBLICATIONS

"Data Managemment System for Predictive Maintenance Programs" by R. L. Remillard, Sound & Vibration, Sep. 1985.

"Diagnostic Analysis of Machinery with State-of-the-Art Equipment" by McGuckin & Schramm, Sound & Vibration, Jun. 1985.

Primary Examiner—Parshotam S. Lall
Assistant Examiner—S. A. Melnick
Attorney, Agent, or Firm—Armstrong, Nikaido, Marmelstein, Kubovcik & Murray

[57] ABSTRACT

A data storing apparatus for storing and categorizing data from an analytical instrument, which has a file name creator for obtaining a time signal at the beginning of analysis and for writing the time signal in the file name portion of a data file in a memory as a temporarily assigned file name. The data storing apparatus also has a file name changer for obtaining a new name input thereto, and substituting the new name for the time signal in the file name portion of the data file.

4 Claims, 5 Drawing Sheets

DATA STORING APPARATUS

BACKGROUND OF THE INVENTION

1. Field of the Invention

The present invention relates to a data storing apparatus which is capable of storing analytical data in an electronic form and is capable of outputting the data. The present invention especially relates to the data storing apparatus which is included in an analytical instrument such as thermal analysis instrument, a chromatographic analysis instrument or a testing machine such as a tensile test machine.

2. Description of Related Art

Generally, analytical instruments have automatic specimen changers. Once every analytical operating condition, for every specimen which is set on the changer, is set by the operator, the analysis of all specimens on the sample changers occurs and analytical data is generated and output from the analyzer to a data storing apparatus which is connected to the analyzer. As a result the analytical data is recorded in the data storing apparatus.

A data storing apparatus has been known which gives a sequential number to a data file when it starts storing data in that data file. The sequential number functions as a file name so that it would be used for accessing the data file.

If an operator wants to check a descriptive file name in order to indicate the nature of the data stored in the file, the operator has to type in the data name, such as specimen name or analytical condition, when the particular specimen is beginning to be analyzed. This means that the operator should be in front of the data storing apparatus during the entire analysis even though the analysis can be done without the operator.

SUMMARY OF THE INVENTION

The present invention has been proposed in view of the above and aims at providing a fully automatic data storing apparatus which can overcome the above-mentioned problems pertaining to the conventional apparatus.

In order to achieve the above object, according to the invention, when starting to record an analytical data, a temporary file name which is comprised of numbers representing the time, possibly the date and time, of that instant is assigned by the storing apparatus automatically. The data file, which is composed of a file name portion, a title portion and a real analytical data portion, is created for storing data of each specimen analysis in a memory which is included in or connected to the data storing apparatus.

Further, according to the invention, the temporarily assigned file name can be changed by operator anytime after the analytical run and data storing has been finished. The operator can give the file name whatever name is desired, such as a specimen name or an analytical condition or both.

Moreover, according to the instant invention, the data file includes the title portion as well as the file name portion. The title portion allows the operator to write a much more descriptive title on the data file.

It is a basic notion of the instant invention that operators more easily recall the time when their analysis was done rather than a sequential number assigned to the analysis.

BRIEF DESCRIPTION OF THE DRAWINGS

The above and other objects, features and advantages of the instant invention will become apparent from reading the following description of the preferred embodiment, taking in conjunction with the accompanying drawings, wherein.

DESCRIPTION OF THE PREFERRED EMBODIMENTS

Embodiments of the present invention when included with a differential thermal analysis instrument which is one type of thermal analysis instruments, will now be described with reference to the accompanying drawings.

Figure 1:
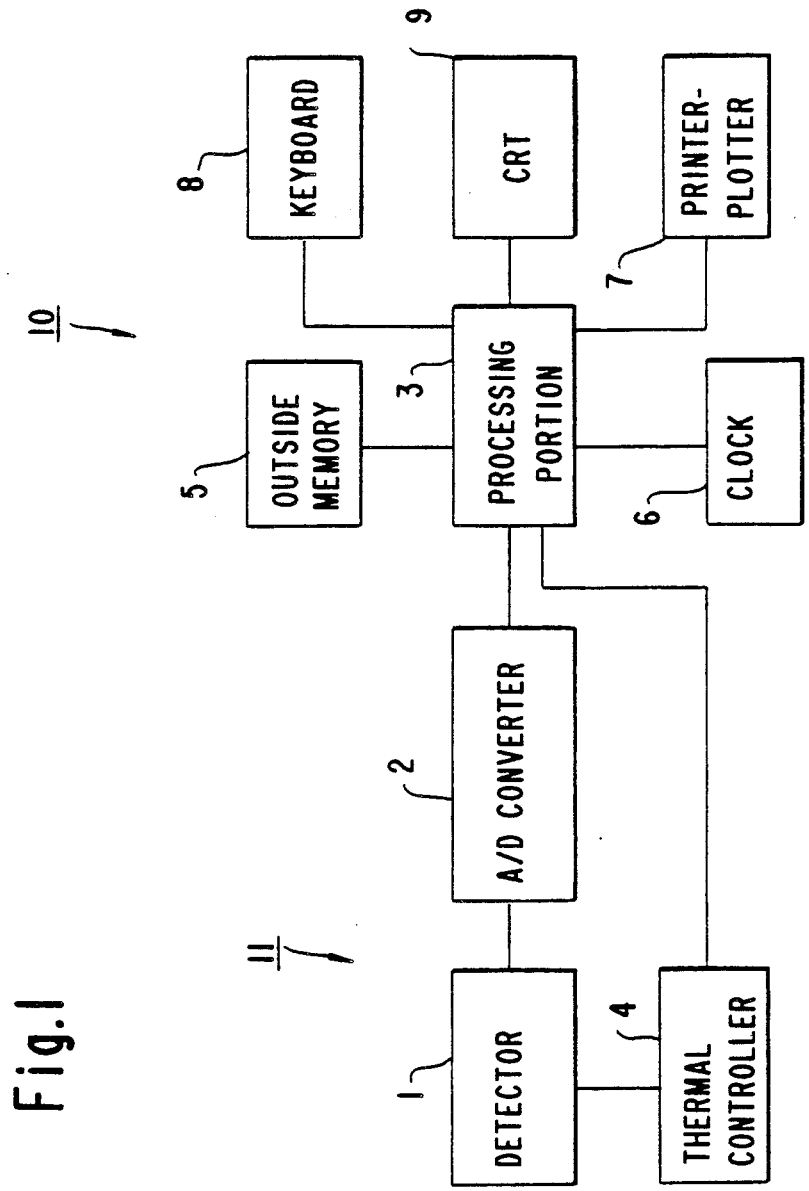
FIG. 1 is a block diagram of an embodiment of the instant invention, which is included with a thermal analysis instrument.

Referring first to FIG. 1, the data storing apparatus, generally shown as reference numberal 10, is included with a differential thermal analysis instrument, generally shown as reference numberal 11. A detector 1 detects a weight difference of a specimen according to a temperature change, and generates an electronic signal through an analog-digital converter 2. The converted digital signal is read by a processing portion 3. A thermal controller 4 controls specimen temperature. A clock 6 generates a date and time signal in a digital signal form, and sends it to the processing portion 3. A printer-plotter 7 is used for outputting the data in a graph or a table. A key board 8 is used to type in some information such as a title of a data file. The signal from the analyzer, as well as the signal of the date and time and typed in information are stored in the outside memory 5. A hard disc, a tape and most preferably a floppy disc are example of the outside memory. The processing portion 3 is comprised of a CPU, RAM and ROM. In the ROM, there are means, such as computer programs, for creating a data file in order to store analytical data and for changing a file name of the file. Also in the ROM there are means, such as programs, for controlling the differential thermal analyzer II and providing an analysis of the condition of the specimen.

Figure 2:
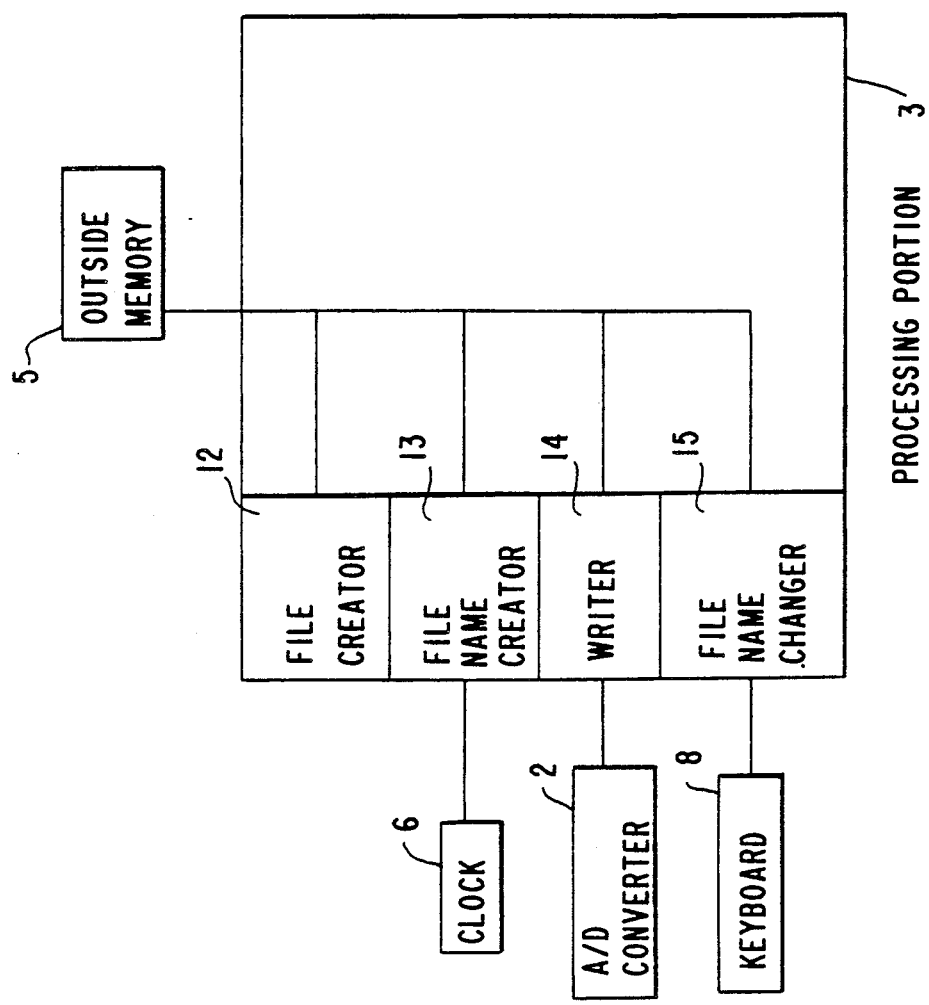
FIG. 2 is a schematic diagram of the internal structure of the processing portion 3 of FIG. 1.
Figure 3:
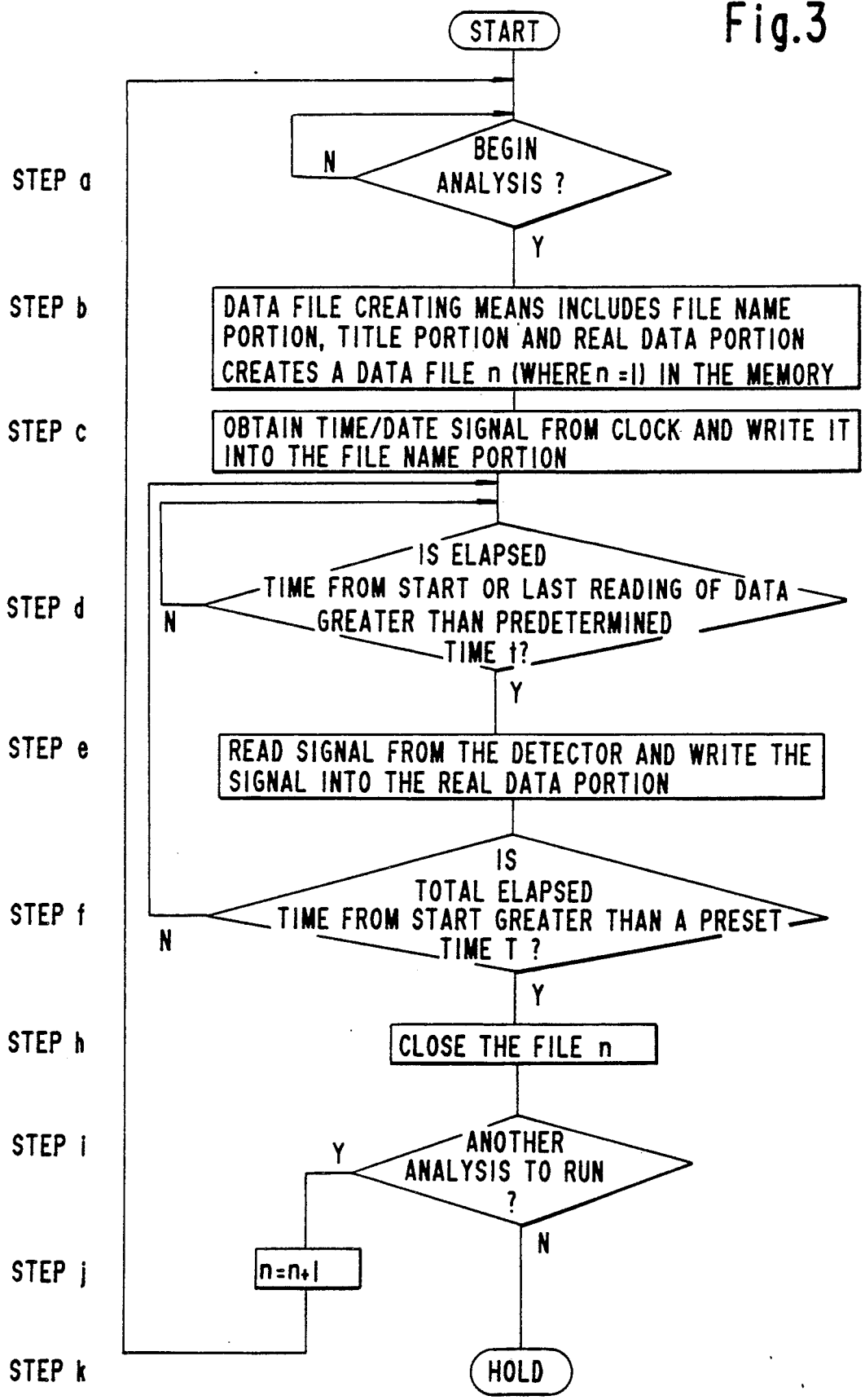
FIG. 3 is a flow chart illustrating a procedure for storing data in a file.

FIG. 2 is a schematic diagram of the internal structure of the processing portion 3 of FIG. 1. A file creator 12, a file name creator 13, a writer 14, and a file name changer 15, all of which are connected to outside memory 5 by a bass-coded are included in the processing portion 3. The file name creator 13 is connected to the clock 6, the writer 14 is connected to the analog-digital converter 2, and the file name changer 15 is connected to the key board 8, as well.

The operation of the embodiment is now described. Referring FIG. 2, in step a, if an analytical run is started at the differential thermal analyzer, then the process goes to step b. If the analytical run is not started, the step a is repeated. In step b, a new data file which includes a file name portion, a title portion and a real data portion, is created on the outside memory 5. The new data file is assigned a file indicating number n where n=1, which is used for distinguishing files. In step c, a date and time signal is sent from the clock 6 to the processing portion 3 and is output to the outside memory. The date and time signal is written as a temporary file name in the file name portion of the newly opened data file in the outside memory. In steps d and e, every predetermined time period t, such as 0.1 seconds, the differential weight data signal is transmitted from the detector 1 through the analog-digital converter 2 to the processing portion 3. Then the signal is converted for storing, the converted signal data is written in the real data portion of the file. In step f, it is determined that the analysis is finished when the total elapsed 10 time from a start of the analytical run becomes greater than a preset time T, which is an expected analytical time for a particular specimen. If the answer to step f is NO, the sampling and writing process in step d and e is repeated until the analysis is finished. If the answer to step f is YES, then in step h, the data file n is closed. In step i, if any specimen set remains on a sample changer in which samples to be analyzed are loaded, the sample changer transfers new sample specimen into an analyzing area and a new analytical run begins. If the answer to step i is YES (i.e. there is another sample on the sample changer to be analyzed), then in step j, the file indicating number n increases by one. The process for storing data is newly started and data is stored at a newly created data file in the same manner described above. If the answer to step i is NO, then the process proceeds to HOLD to wait to change the file names.

Figure 5:
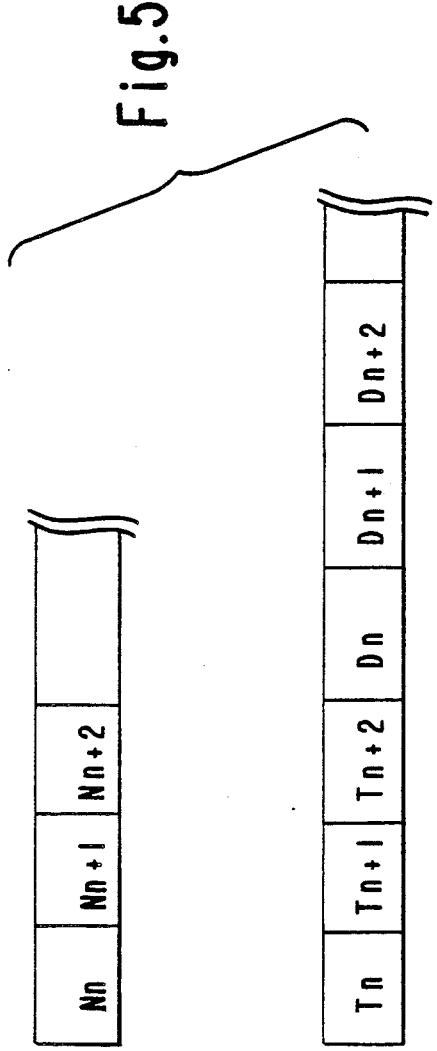
FIG. 5 is a drawing illustrating a format of the data file.

A file format of the data file is illustrated in FIG. 5. Each file has a file name record portion Nn, a title record portion Tn, and a real data portion Dn. The file name record portion is assigned the time/data when the file is created. The title record portion remains blank for a later data storing process and is designed to receive a descriptive title of the file therein written by the operator such as the specimen name or the weight of specimen.

Figure 4:
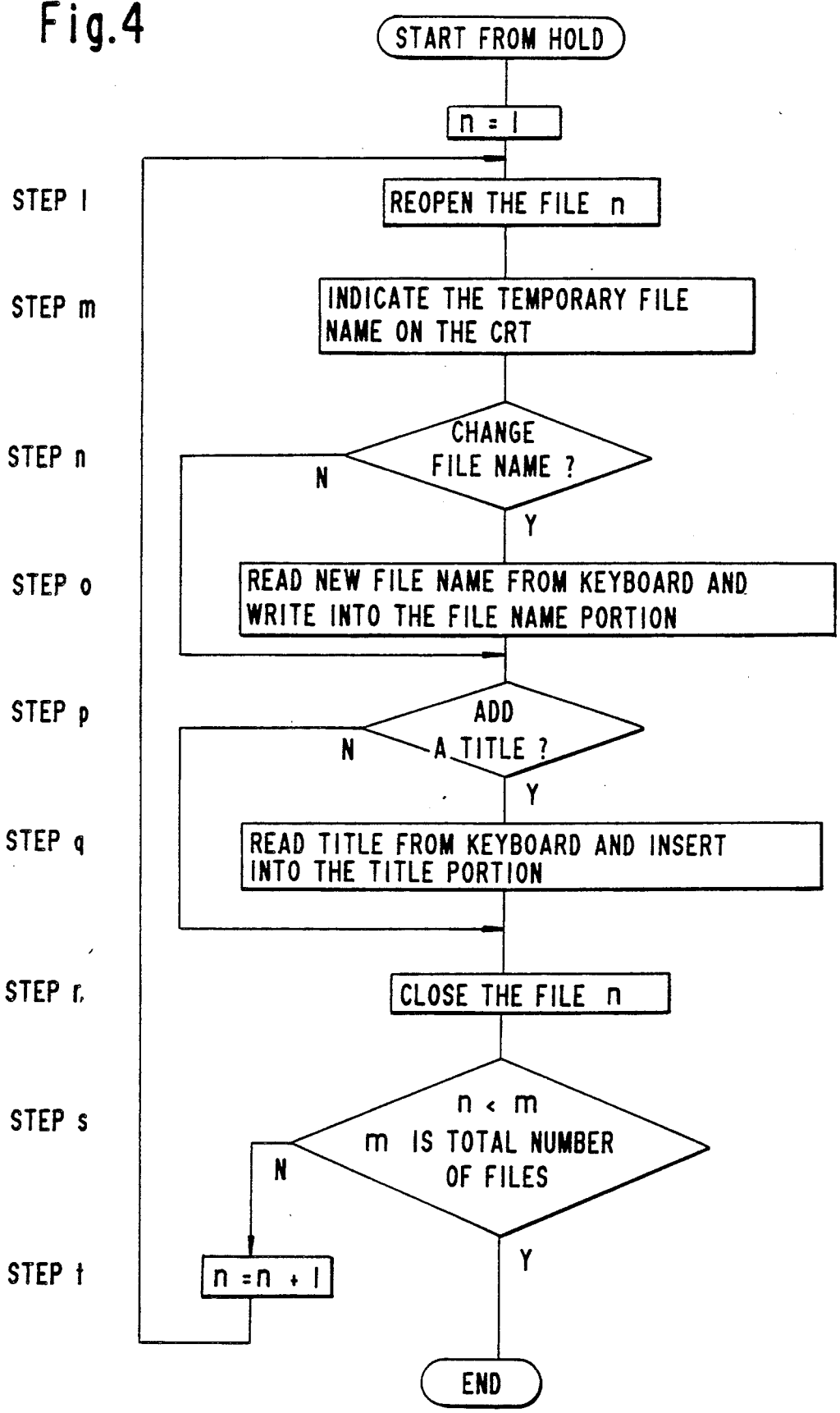
FIG. 4 is a flow chart illustrating a procedure of changing a file name.

The process of changing the file name is illustrated in the FIG. 4, along with the title writing process. After a series of automatic data storing is finished, the file name changing program can be run immediately thereafter or at a later time. First, the file indicating number n is set to one, then in step 1, a data file n, which includes the data and assigned temporary file name (time/date), and has been stored in the outside memory, is reopened. In step m, the file name data in the file name record 10 portion of the data file is obtained by the processing portion and the temporal assigned file name, which is a date and time, is shown on the CRT. In step n, an operator can chose whether to change the temporarily assigned file name or not. If the answer to step n is YES, then in step o, a proper file name is typed in through the key board by the operator and the temporary assigned file name data in the file name portion is replaced by the typed file name. If the answer to step n is NO, then the process goes to step p. In step p, an operator can chose whether to add a title to that file. If the answer to step p is YES, then in step q, a title of the data file is typed in through the key board and the title is written into the title portion of the data file. If the answer to step p is NO, then the process goes to step r. In step r, the data file n is closed. In step s, where the number m is a total number of data files, a judgment is made whether there any files remain which have not yet been considered for changing their names. If the answer to step s is NO, then in step t, the file number n increases by one, and then the name changing and title writing of files are continued in the same manner described above. If the answer to step s is YES, then the process ends.

In the present invention, a RAM memory that is inside the processing portion 3 may be used instead of the outside memory.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. An apparatus for recording and categorizing data obtained from an analytical instrument, said apparatus comprising:

a memory for receiving and storing data;

a clock for generating a time signal;

a data file creating means for creating a data file in said memory when an analysis start signal is received from said analytical instrument, said data file including at least a file name portion and a real data portion;

a file name creating means for obtaining a time signal from said clock and for writing said time signal in the file name portion of said data file, such that said data file is initially named with the time represented by said time signal from said clock;

a writing means for obtaining analytical data from said analytical instrument and for writing said analytical data in the real data portion of said data file; and a file name changing means for obtaining a new name input thereto, and for substituting said new name for said time in the file name portion of said data file; whereby an operator can change the originally assigned name of said data file from said time to another name, using the time of conducting the analysis as a key.

2. The apparatus of claim 1, wherein said time signal includes the time and data.

3. The apparatus of one of claim 1 and 2, wherein said data file creating means further creates a title portion for each file.

4. A method for recording and categorizing data obtained from an analytical instrument which, upon initation of analysis, can produce an analysis start signal, comprising the steps of:

providing a memory for receiving and storing data;

providing a clock for generating a time signal;

providing a data file creating means for creating a data file in said memory when an analysis start signal is received from said analytical instrument, said data file including at least a file name portion and a real data portion;

providing a file name creating means for obtaining a time signal from said clock and for writing said time signal in the file name portion of said data file, such that said data file is initially named with the time represented by said time signal from said clock;

providing a writing means for obtaining analytical data from said analytical instrument and for writing said analytical data in the real data portion of said data file;

providing a file name changing means for obtaining a new name input thereto, and for substituting said new name for said time in the file name portion of said data file;

using said analytical instrument to produce said analysis start signal;

using said data file creating means for creating said data file in said memory when said analysis start signal is received from said analytical instrument;

using said file name creating means for obtaining said time signal from said clock and for writing said time signal in the file name portion of said data file, such that said data file is initially named with said time represented by said time signal from said clock;

using said writing means for obtaining said analytical data from said analytical instrument and for writing said analytical data in said real data portion of said data file;

using said file name changing means for obtaining a new name input thereto by an operator using the originally assigned name of said data file from said time to another name, using the time of conducting the analysis as a key, and using said file name changing means for substituting said new name for said time in the file name portion of said data file; whereby an operator can change the originally assigned name of said data file from said time to another name, using said time of conducting said analysis as a key.

* * * * *

UNITED STATES PATENT AND TRADEMARK OFFICE
CERTIFICATE OF CORRECTION

PATENT NO. : 5,124,937

DATED : June 23, 1992

INVENTOR(S) : UCHIIKE et al

It is certified that error appears in the above-identified patent and that said Letters Patent is hereby corrected as shown below:

On the title page, Item [30], lines 1-2 should be deleted.

Signed and Sealed this

Fourteenth Day of September, 1993

Attest:

BRUCE LEHMAN

*Attesting Officer*  *Commissioner of Patents and Trademarks*